US011009916B1

(12) United States Patent
Chen et al.

(10) Patent No.: US 11,009,916 B1
(45) Date of Patent: May 18, 2021

(54) TOUCH INPUT DEVICE

(71) Applicant: SUNREX TECHNOLOGY CORP., Taichung (TW)

(72) Inventors: Chun-Chieh Chen, Taichung (TW); Yi-Wen Tsai, Taichung (TW); Ching-Yao Huang, Taichung (TW); Ling-Cheng Tseng, Taichung (TW)

(73) Assignee: SUNREXTECHNOLOGY CORP., Taichung (TW)

( * ) Notice: Subject to any disclaimer, the term of this patent is extended or adjusted under 35 U.S.C. 154(b) by 0 days.

(21) Appl. No.: 16/913,833

(22) Filed: Jun. 26, 2020

(30) Foreign Application Priority Data

Mar. 6, 2020 (TW) .................................. 109202521

(51) Int. Cl.
*G06F 1/16* (2006.01)
(52) U.S. Cl.
CPC .......... *G06F 1/1658* (2013.01); *G06F 1/1643* (2013.01)

(58) Field of Classification Search
CPC .......... G06F 3/041; G06F 3/0354; H05K 5/00
See application file for complete search history.

(56) References Cited

U.S. PATENT DOCUMENTS 10,521,029 B1 * 12/2019 Huang .................. H01H 21/86
2014/0071050 A1 * 3/2014 Armstrong-Muntner ....................
G06F 3/042
345/158

* cited by examiner

*Primary Examiner* — Jerry Wu
(74) *Attorney, Agent, or Firm* — Burris Law, PLLC

(57) ABSTRACT

A touch input device includes a frame unit, a circuit unit and a touch pad. The circuit unit includes a circuit board, a dome-shaped actuating member including an actuating portion and a resilient metal sheet connected between the actuating portion and the circuit board, and a noise reduction member having a main body connected to the resilient metal sheet, made of an elastic material and formed with a recess surrounding the actuating portion. A touch surface of the touch pad is touchable to push the circuit unit toward the block member, such that the actuating portion contacts the block member to deform the resilient metal sheet to electrically connect the actuating portion with the circuit board.

3 Claims, 7 Drawing Sheets

US 11,009,916 B1

TOUCH INPUT DEVICE

CROSS-REFERENCE TO RELATED APPLICATION

This application claims priority of Taiwanese Utility Model Patent Application No. 109202521, filed on Mar. 6, 2020.

FIELD

The disclosure relates to a touch input device, and more particularly to a touch input device with noise reduction capability.

BACKGROUND

A conventional touch input device includes a bottom plate, a touch pad that is spaced apart from the bottom plate, a circuit board that is disposed between the bottom plate and the touch pad, and a resilient metal sheet that is connected to the circuit board and that includes an actuating portion extending toward the bottom plate. A user can touch the touch pad to push the circuit board to move toward the bottom plate, such that the actuating portion comes into contact with the bottom plate to deform the resilient metal sheet and to allow the actuating portion to be in electrical connection with the circuit board to generate a touch signal.

However, the vibration of air within the conventional touch input device, the deformation of the resilient metal sheet, and the contact between the actuating portion and the bottom plate all contribute to noise generated when the conventional touch input device is touched by the user.

Therefore, it is desirable in the art to provide a touch input device with noise reduction capability.

SUMMARY

Therefore, an object of the present disclosure is to provide a touch input device that can alleviate at least one of the drawbacks associated with the prior art.

According to this disclosure, a touch input device includes a frame unit, a circuit unit and a touch pad.

The frame unit includes a block member. The circuit unit includes a circuit board, an actuating member, and a noise reduction member. The circuit board is connected to the frame unit and is spaced apart from the block member. The actuating member is dome-shaped and protrudes toward the block member. The actuating member includes an actuating portion and a resilient metal sheet that surrounds the actuating portion and that is connected between the actuating portion and the circuit board. The noise reduction member has a main body which is connected to the resilient metal sheet of the actuating member, which is made of an elastic material, and which is formed with a recess surrounding the actuating portion of the actuating member. The touch pad is connected to the frame unit such that the touch pad and the block member are located respectively at two sides of the circuit board. The touch pad has a touch surface faces away from the circuit unit.

The touch surface of the touch pad is adapted to be touched by a user to push the circuit unit to move toward the block member of the frame unit, such that the actuating portion of the actuating member comes into contact with the block member to deform the resilient metal sheet of the actuating member and to allow the actuating portion to be in electrical connection with the circuit board to generate a touch signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
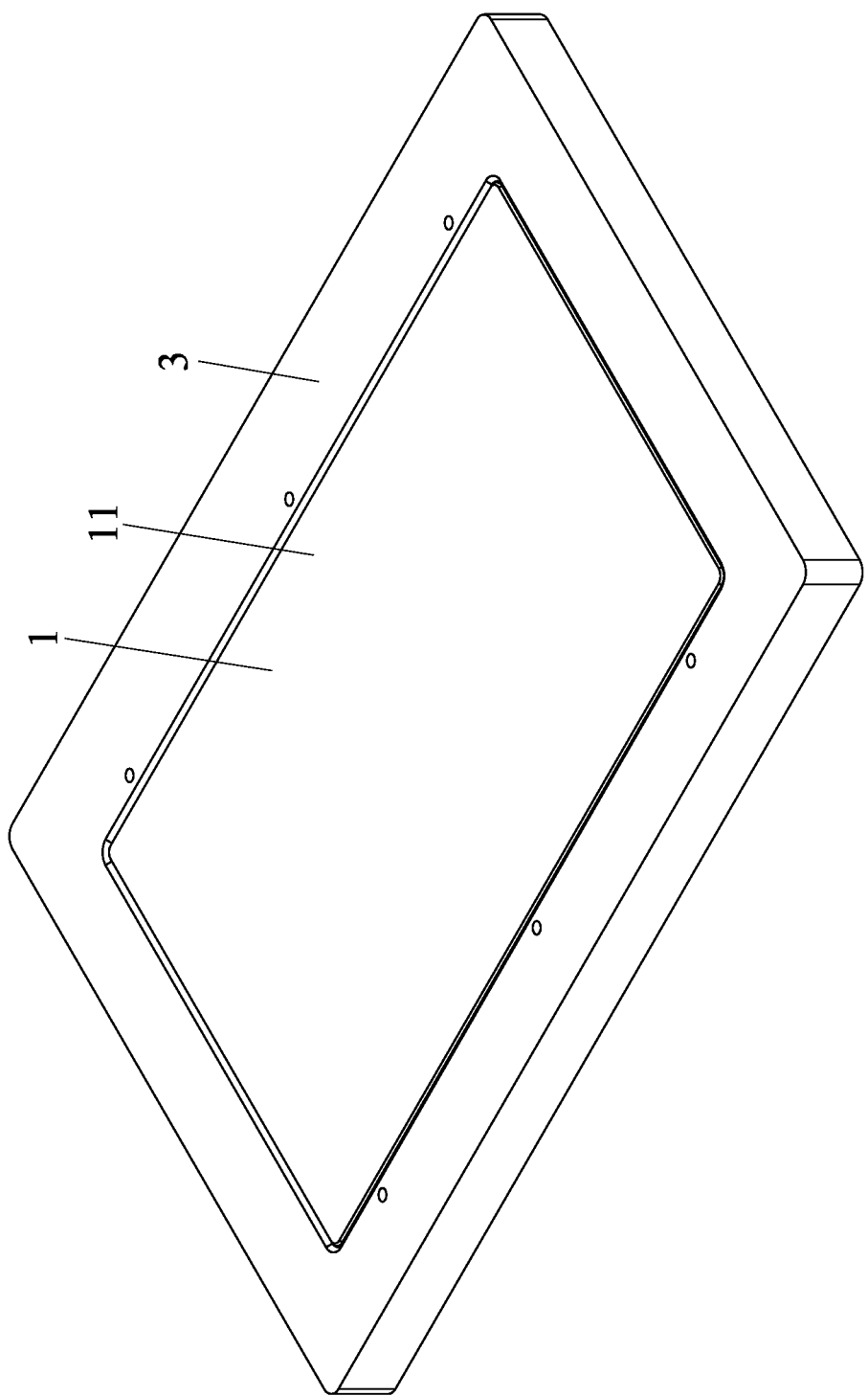
FIG. 1 is a top perspective view of an embodiment of the touch input device according to the present disclosure.
Figure 2:
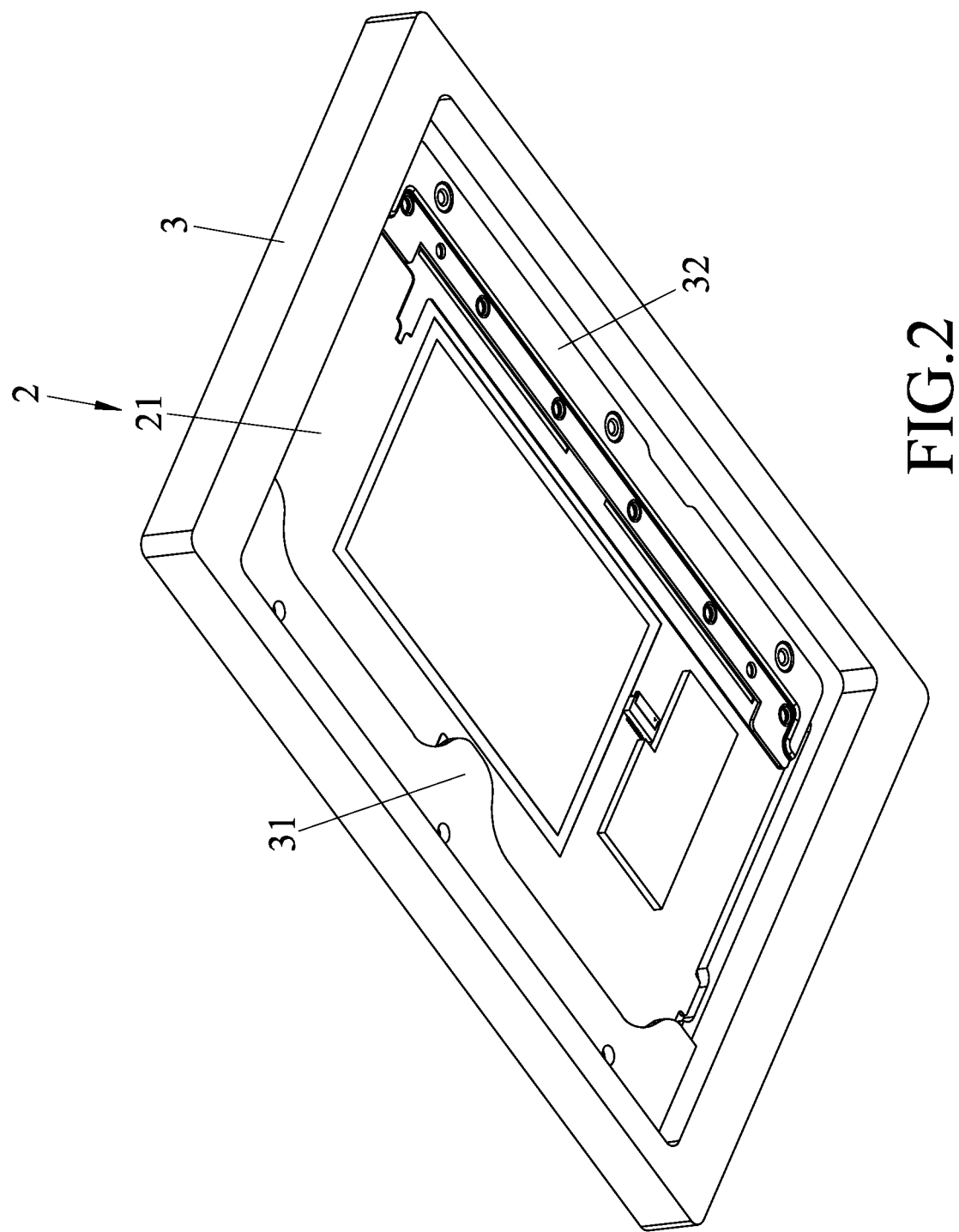
FIG. 2 is a bottom perspective view of the embodiment.
Figure 3:
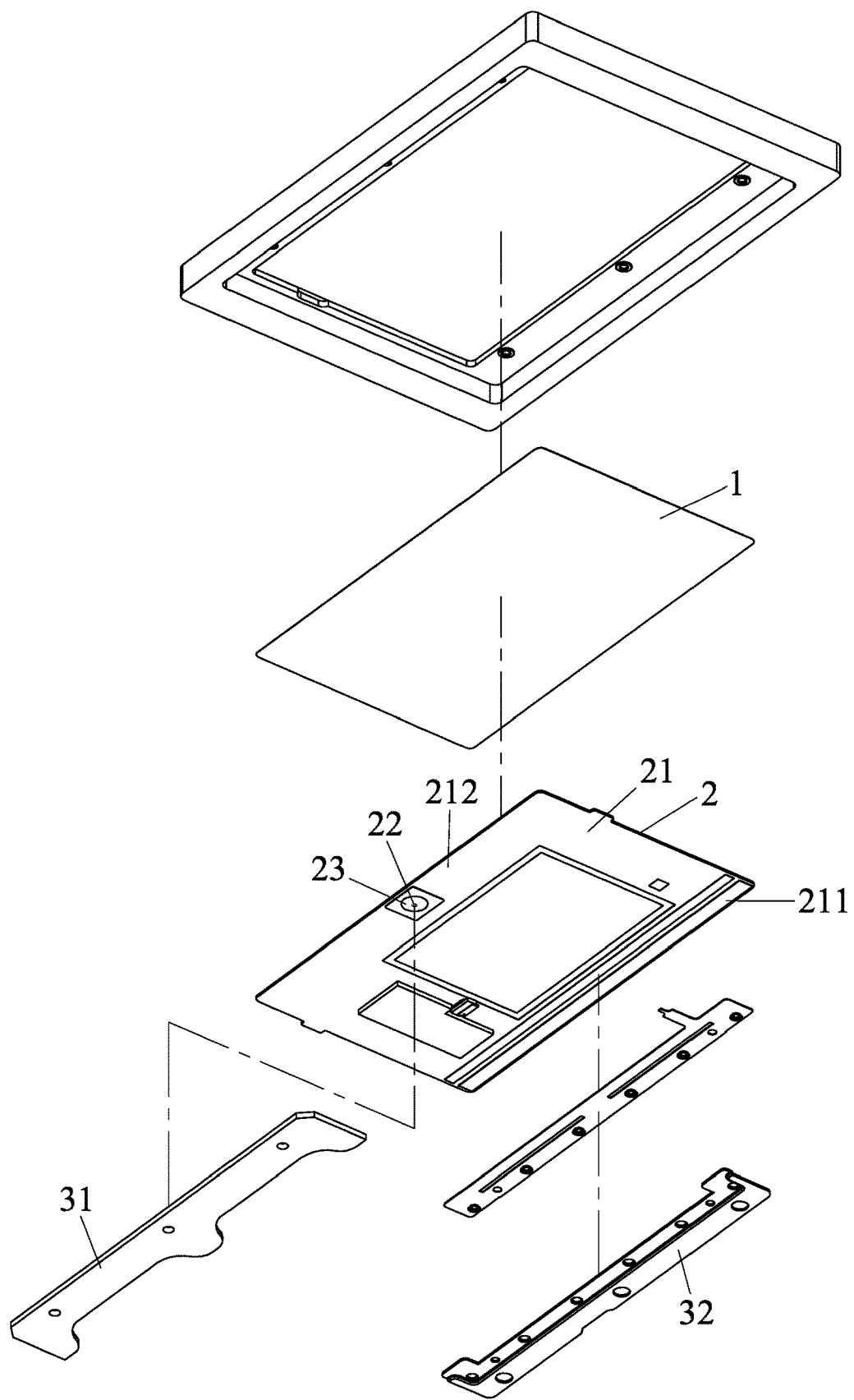
FIG. 3 is an exploded perspective view of the embodiment.
Figure 4:
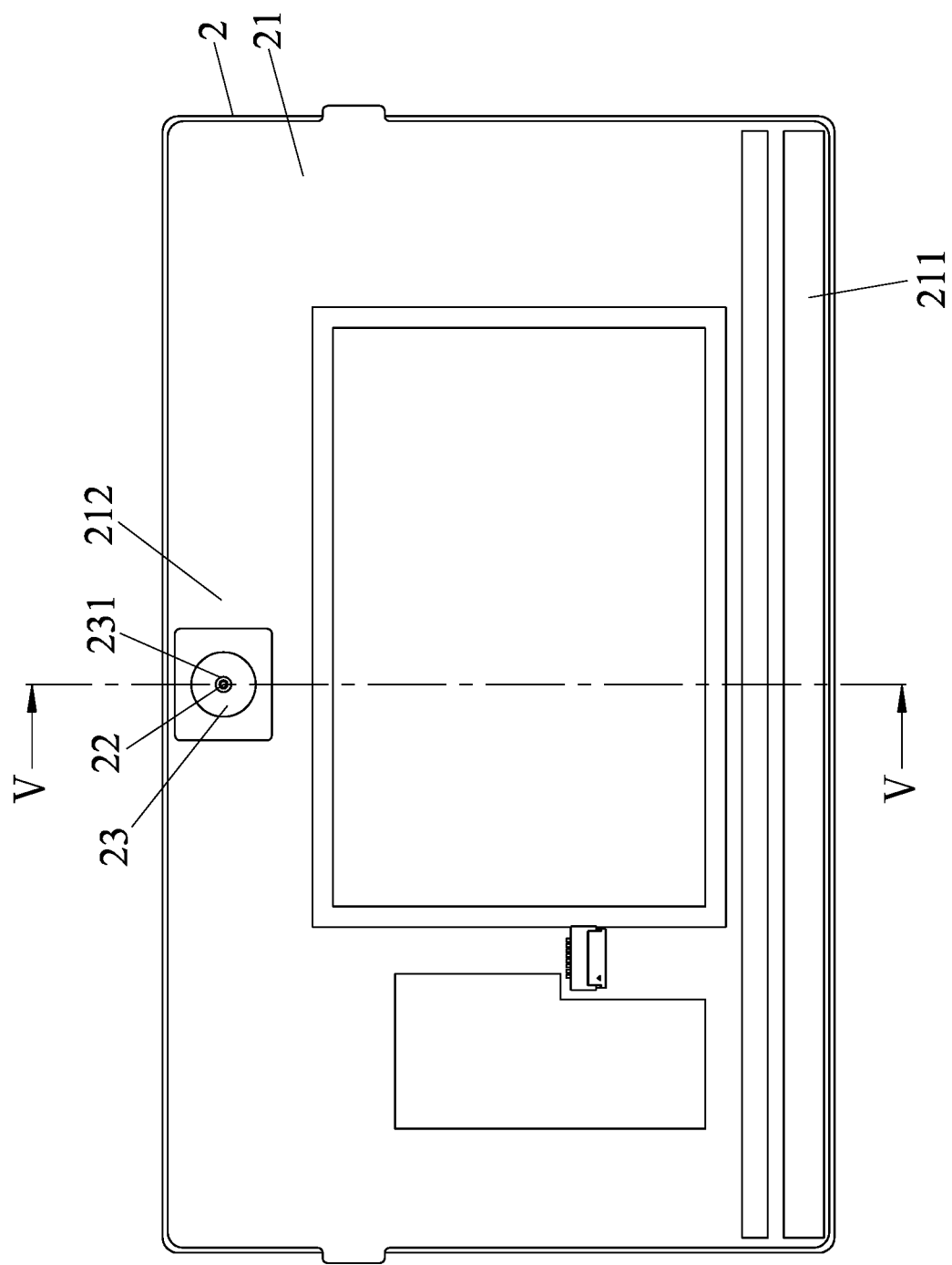
FIG. 4 is a top view of a circuit unit of the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 5, an embodiment of the touch input device includes a touch pad 1, a circuit unit 2 and a frame unit 3. The frame unit 3 includes a block member 31 and a mounting member 32 that are disposed respectively at two opposite sides of the frame unit 3. The touch pad 1 is connected to the frame unit 3, and has a touch surface 11. The circuit unit 2 includes a circuit board 21, an actuating member 22 and a noise reduction member 23. The circuit board 21 is connected to the frame unit 3 and is spaced apart from the block member 31, such that the touch pad 1 and the block member 31 are located respectively at two sides of the circuit board 21. The touch surface 11 of the touch pad 1 faces away from the circuit unit 2. In this embodiment, the circuit board 21 includes a connecting side portion 211 that is connected pivotally to the mounting member 32 of the frame unit 3, and a free side portion 212 that is opposite to the connecting side portion 211. The actuating member 22 is dome-shaped and protrudes toward the block member 31. Referring further to FIG. 6, in this embodiment, the actuating member 22 includes an actuating portion 221, and a resilient metal sheet 222 that surrounds the actuating portion 221 and that is connected between the actuating portion 221 and the free side portion 212 of the circuit board 21. In this embodiment, the actuating portion 221 of the actuating member 22 extends from the resilient metal sheet 222 toward the block member 31 of the frame unit 3. The noise reduction member 23 has a main body 232 which is connected to the resilient metal sheet 222 of the actuating member 22, which is made of an elastic material, and which is formed with a recess 231 surrounding the actuating portion 221 of the actuating member 22.

Figure 5:
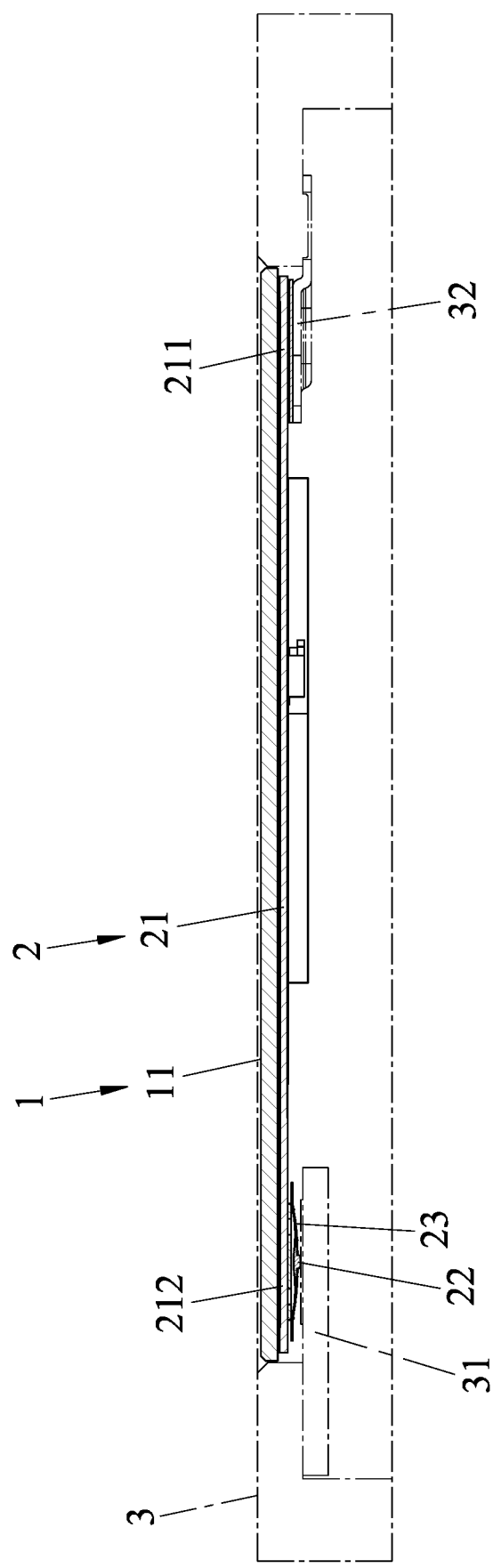
FIG. 5 is a schematic sectional view of the embodiment, taken along line V-V of FIG. 4.
Figure 6:
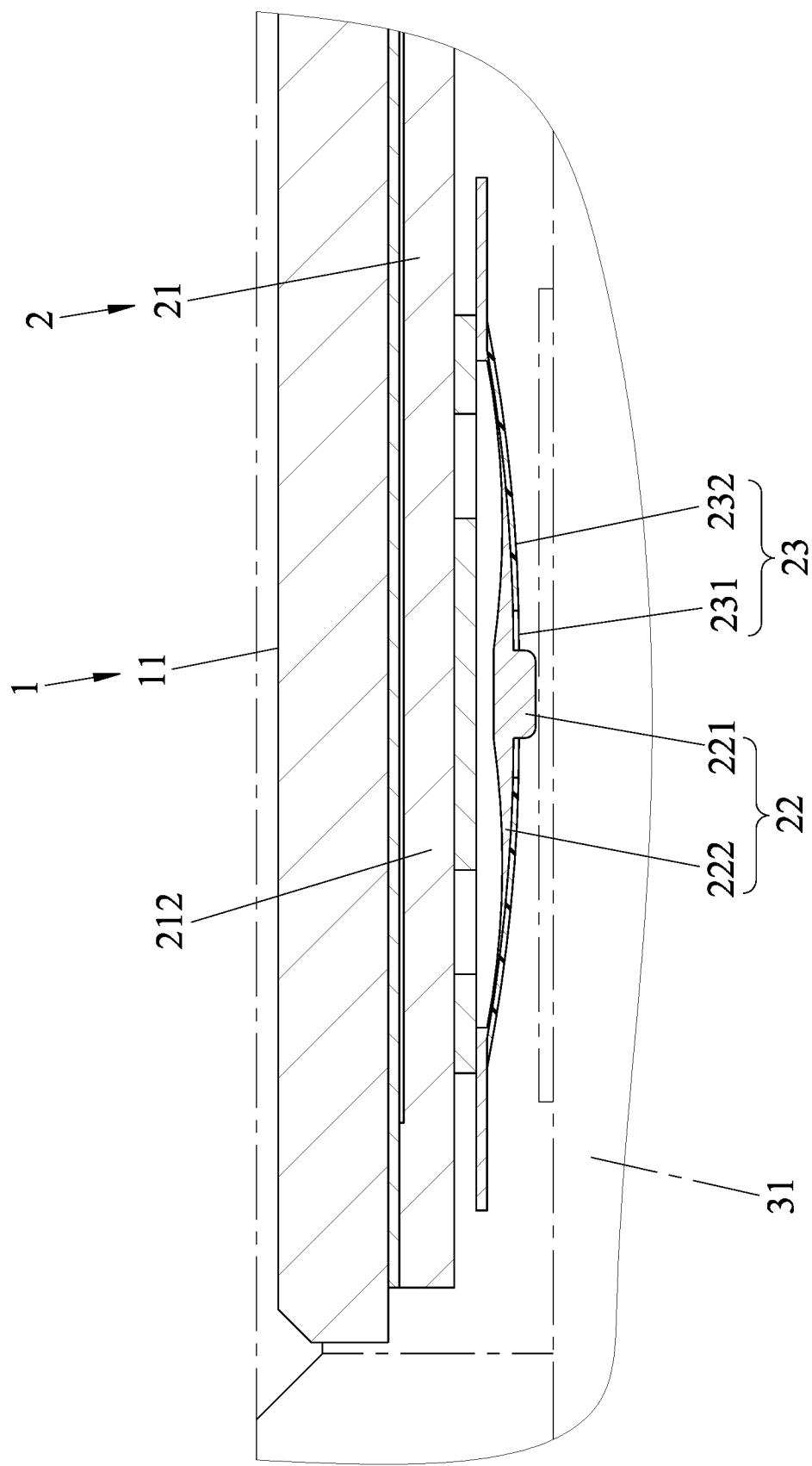
FIG. 6 is an enlarged view of a portion of FIG. 5.
Figure 7:
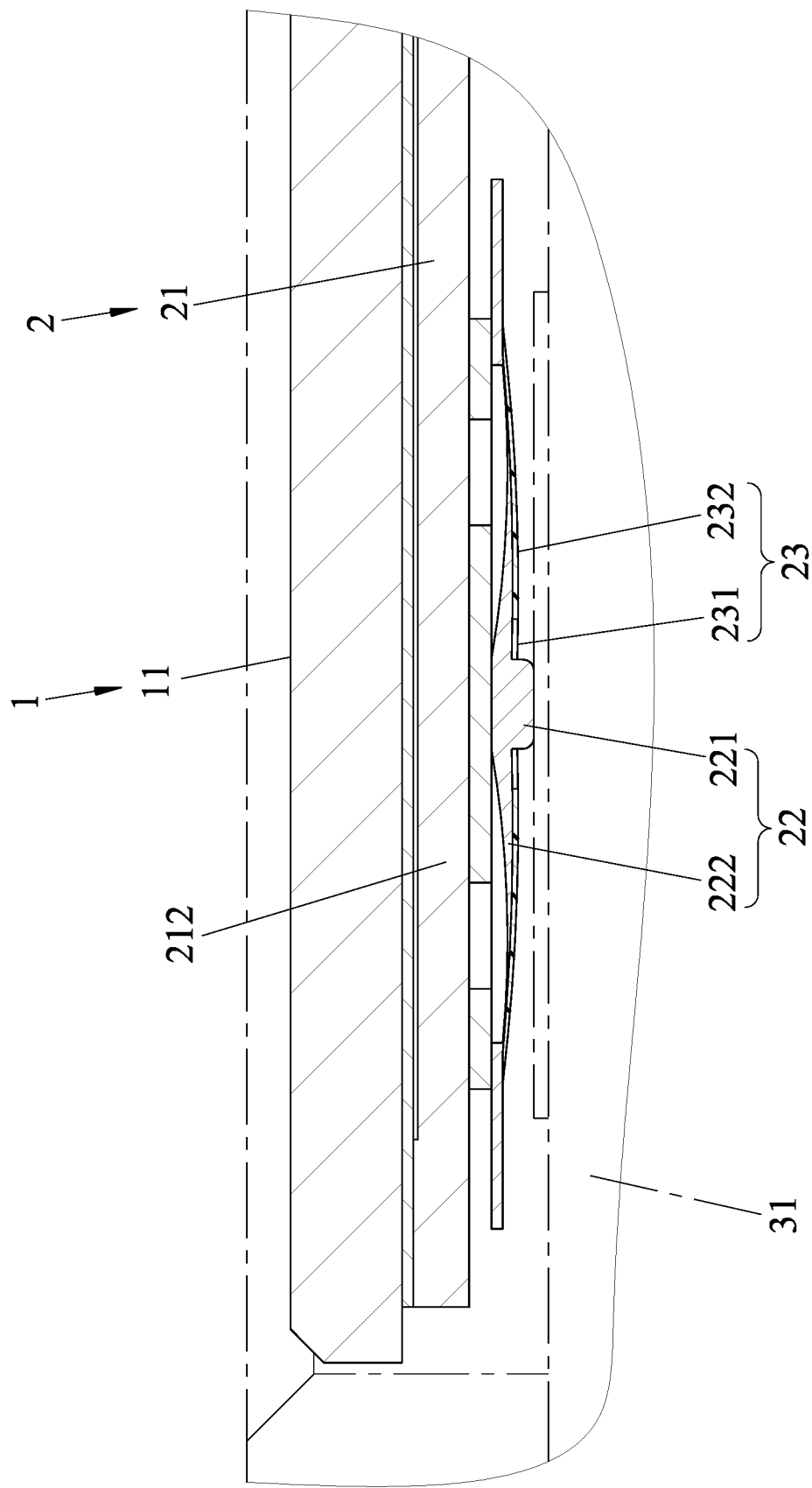
FIG. 7 is a view similar to FIG. 6, but illustrating that the embodiment is touched by a user.

Referring to FIGS. 5 to 7, the touch surface 11 of the touch pad 1 is adapted to be touched by a user (not shown). As shown in FIG. 6, before the touch surface 11 is touched, the free side portion 212 of the circuit board 21 is spaced apart from both the actuating portion 221 of the actuating member 22 and the block member 31 of the frame unit 3, and the resilient metal sheet 222 of the actuating member 22 is not deformed. As shown in FIG. 7, when the touch surface 11 of the touch pad 1 is touched by the user, the touch pad 1 together with the circuit unit 2 are moved toward the block member of the frame unit 3. During such movement, the connecting side portion 211 of the circuit board 21 is pivoted relative to the mounting member 32 of the frame unit 3 such that the free side portion 212 of the circuit board 21 is moved toward the block member 31, and the actuating portion 221 of the actuating member 22 is then moved into contact with the block member 31 to deform the resilient metal sheet 222 and to allow the actuating portion 221 to be in electrical connection with the circuit board 21 to generate a touch signal representing the touch action of the user.

Since the main body 232 of the noise reduction member 23 is made of the elastic material (e.g., sponge, silica gel, etc.), the noise reduction member 23 is capable of absorbing the vibration of the actuating member 22 when the actuating portion 221 comes into contact with the block member 31 and when the resilient metal sheet 222 is deformed. The noise reduction member 23 is also capable of absorbing vibration of air within the touch input device during the touch action. Moreover, the recess 231 allows the air to vibrate therein between the main body 232 of the noise reduction member 23 and the actuating portion 221 of the actuating member 22, which also helps to absorb vibration of the air. It should be noted that the recess 231 may extend partially into the main body 232 of the noise reduction member 23 or penetrate the main body 232.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch input device comprising: a frame unit including a block member; a circuit unit including a circuit board that is connected to said frame unit and that is spaced apart from said block member, an actuating member that is dome-shaped and that protrudes toward said block member, said actuating member including an actuating portion protrude from the resilient metal sheet toward said block member, and a resilient metal sheet that surrounds said actuating portion and that is connected between said actuating portion and said circuit board, and a noise reduction member that has a main body, said main body being attached along said resilient metal sheet of said actuating member, being made of an elastic material, and being formed with a recess penetrating said main body and surrounding said actuating portion of said actuating member; and a touch pad connected to said frame unit such that said touch pad and said block member are located respectively at two opposite sides of said circuit board, said touch pad having a touch surface facing away from said circuit unit; wherein said touch surface of said touch pad is adapted to be touched by a user to push said circuit unit to move toward said block member of said frame unit, such that said actuating portion of said actuating member comes into contact with said block member to deform said resilient metal sheet of said actuating member and to allow said actuating portion to be in electrical connection with said circuit board to generate a touch signal.

2. The touch input device as claimed in claim 1, wherein:
said frame unit further includes a mounting member, said block member and said mounting member being disposed respectively at two opposite sides of said frame unit;
said circuit board includes a connecting side portion that is connected pivotably to said mounting member of said frame unit, and a free side portion opposite to said connecting side portion; and
said resilient metal sheet of said actuating member is connected between said actuating portion and said free side portion of said circuit board.

3. The touch input device as claimed in claim 1, wherein said noise reduction member is made of one of sponge and silica gel.

* * * * *